(12) United States Patent
Sumi et al.

(10) Patent No.: US 11,257,296 B2
(45) Date of Patent: Feb. 22, 2022

(54) DISPLAY SYSTEM, ADDITIVE MANUFACTURING DEVICE, AND PROGRESS DISPLAY METHOD

(71) Applicant: Mitsubishi Electric Corporation, Tokyo (JP)

(72) Inventors: Nobuyuki Sumi, Tokyo (JP); Shun Kayashima, Tokyo (JP); Kenji Iriguchi, Tokyo (JP); Seiji Uozumi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/273,742

(22) PCT Filed: Oct. 18, 2018

(86) PCT No.: PCT/JP2018/038792
§ 371 (c)(1),
(2) Date: Mar. 5, 2021

(87) PCT Pub. No.: WO2020/079796
PCT Pub. Date: Apr. 23, 2020

(65) Prior Publication Data
US 2021/0248834 A1    Aug. 12, 2021

(51) Int. Cl.
*G06T 15/00* (2011.01)
*G06T 19/00* (2011.01)
(Continued)

(52) U.S. Cl.
CPC ............ *G06T 19/006* (2013.01); *B33Y 30/00* (2014.12); *B33Y 50/00* (2014.12); *G06F 3/14* (2013.01); *G06T 2200/24* (2013.01)

(58) Field of Classification Search
CPC ......... G06T 19/00; G06T 17/20; G06T 17/00; G06T 15/10; G06T 15/00
(Continued)

(56) References Cited

U.S. PATENT DOCUMENTS 10,061,295 B2    8/2018 Murakawa
2015/0309494 A1    10/2015 Kobayashi et al.
(Continued)

FOREIGN PATENT DOCUMENTS

CN    105034359 A    11/2015
JP    2011-165066 A    8/2011
(Continued)

OTHER PUBLICATIONS

International Search Report and Written Opinion dated Dec. 25, 2018, received for PCT Application PCT/JP2018/038792 Filed on Oct. 18, 2018, 9 pages including English Translation.
(Continued)

*Primary Examiner* — Gordon G Liu
(74) *Attorney, Agent, or Firm* — Xsensus LLP

(57) ABSTRACT

A display system displays the progress of processing in an additive manufacturing device. The additive manufacturing device manufactures an object with a three-dimensional shape by processing of adding material on the basis of CAD data that is design data. The display system includes an obtaining unit to obtain position data that indicates the present position of a processing point where the processing is performed. The display system includes a display unit to display a trace of the processing point superimposed over the three-dimensional shape based on the design data.

10 Claims, 6 Drawing Sheets

(51) Int. Cl.
  *B33Y 30/00* (2015.01)
  *B33Y 50/00* (2015.01)
  *G06F 3/14* (2006.01)

(58) Field of Classification Search
  USPC .......................................................... 345/419
  See application file for complete search history.

(56) References Cited

U.S. PATENT DOCUMENTS

| | | |
|---|---|---|
| 2016/0179064 A1 | 6/2016 | Arthur et al. |
| 2016/0209825 A1* | 7/2016 | Murakawa ......... G05B 19/4068 |
| 2017/0203512 A1 | 7/2017 | Gold |
| 2018/0056592 A1 | 3/2018 | Kouno et al. |
| 2018/0150270 A1* | 5/2018 | Harayama ............. G06F 3/1203 |
| 2018/0250773 A1* | 9/2018 | Symeonidis ............... B22F 3/11 |
| 2019/0206134 A1* | 7/2019 | Devam ................... G06F 3/011 |

FOREIGN PATENT DOCUMENTS

| | | |
|---|---|---|
| JP | 2016-27468 A | 2/2016 |
| JP | 2016-134036 A | 7/2016 |
| JP | 2016-173730 A | 9/2016 |
| JP | 2017-140828 A | 8/2017 |
| JP | 2018-034440 A | 3/2018 |
| JP | 2018-89777 A | 6/2018 |

OTHER PUBLICATIONS

Notification of Reasons for Refusal dated Aug. 6, 2019, received for JP Application 2019-524287, 7 pages including English Translation.
Decision to Grant dated Nov. 12, 2019, received for JP Application 2019-524287, 5 pages including English Translation.
Office Action dated Sep. 29, 2021, in corresponding Chinese Patent Application No. 201880098661.9 with an English machine translation thereof, 16pp.

* cited by examiner

DISPLAY SYSTEM, ADDITIVE MANUFACTURING DEVICE, AND PROGRESS DISPLAY METHOD

CROSS-REFERENCE TO RELATED APPLICATION

The present application is based on PCT filing PCT/JP2018/038792, filed Oct. 18, 2018, the entire contents of which are incorporated herein by reference.

FIELD

The present invention relates to a display system, an additive manufacturing device, and a progress display method to display the progress of processing in the additive manufacturing device.

BACKGROUND

There has been known an additive manufacturing device that manufactures an object with a three-dimensional shape by adding material. A user of the additive manufacturing device occasionally checks the state of processing by visually checking an object when the processing is in progress, or by an image of the object captured when the processing is in progress. When a user desires to check the progress status of the processing, such as which part of the three-dimensional shape of a finished product has completed being processed, or which part of the three-dimensional shape has not yet been processed, it has been difficult for the user to understand the progress status from the visual check or the captured image.

Patent Literature 1 discloses a three-dimensional manufacturing device that displays an indicator of the progress status in manufacturing a three-dimensional object on a display unit.

CITATION LIST

Patent Literature

Patent Literature 1: Japanese Patent Application Laid-open No. 2018-34440

SUMMARY

Technical Problem

In the technique disclosed in Patent Literature 1 described above, models of three-dimensional objects are displayed in a two-dimensional figure, and one of the models, which has completed being processed, is colored, while another one of the models, which has not yet completed being processed, is displayed with a percentage indicating the progress status. However, there is a problem with the display using the technique disclosed in Patent Literature 1 in that a user cannot understand the progress of processing of the three-dimensional shape, such as which part of the three-dimensional shape has completed being processed, or which part of the three-dimensional shape has not yet been processed.

The present invention has been achieved to solve the above problems, and an object of the present invention is to provide a display system that can display the progress of processing of a three-dimensional shape by an additive manufacturing device in an easily understandable manner for a user.

Solution to Problem

A display system according to an aspect of the present invention displays a progress of processing by an additive manufacturing device that manufactures an object with a three-dimensional shape by processing of adding material on a basis of design data. The display system according to the present invention comprises: an obtaining unit to obtain position data that indicates a present position of a processing point where the processing is performed; and a display unit to display a trace of the processing point superimposed over the three-dimensional shape based on the design data.

Advantageous Effects of Invention

The display system according to the present invention has an effect where it is possible to display the progress of processing of a three-dimensional shape by an additive manufacturing device in an easily understandable manner for a user.

DESCRIPTION OF EMBODIMENTS

A display system, an additive manufacturing device, and a progress display method according to embodiments of the present invention will be described in detail below with reference to the drawings. The present invention is not limited to the embodiments. In the following descriptions, a numerical control device included in the additive manufacturing device is sometimes referred to as "NC (Numerical Control) device".

First Embodiment

Figure 1:
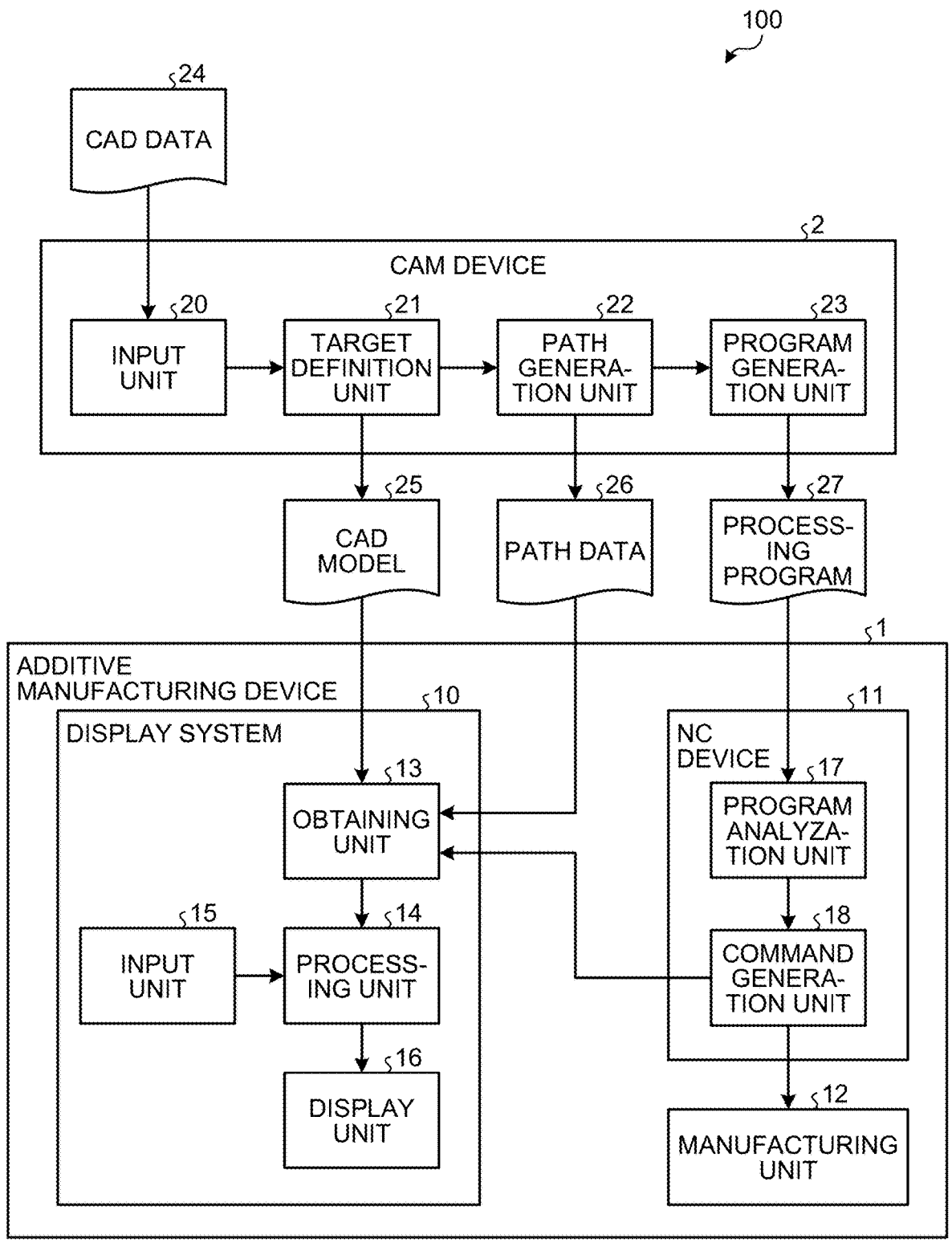
FIG. 1 is a block diagram illustrating a functional configuration of an additive manufacturing system including a display system according to a first embodiment of the present invention.

FIG. 1 is a block diagram illustrating a functional configuration of an additive manufacturing system 100 including a display system 10 according to a first embodiment of the present invention. The additive manufacturing system 100 includes an additive manufacturing device 1 and a CAM (Computer Aided Manufacturing) device 2. The additive manufacturing device 1 is a machine tool that manufactures an object with a three-dimensional shape by adding material.

It is allowable that the additive manufacturing device 1 manufactures an object by using any of various types of methods such as Direct Energy Deposition (DED), material extrusion, material jetting, and powder bed fusion. In the following descriptions, the additive manufacturing device 1 is a DED-type additive manufacturing device that manufactures an object by adding melted material. As a heat source for melting material, a beam source is used. The beam source outputs a beam such as a laser beam or an electronic beam. It is allowable that arc discharge is employed as a heat source. A wire of metal material or powdered metal material is used as the material.

The additive manufacturing device 1 includes the display system 10 that displays the progress status of processing by the additive manufacturing device 1, an NC device 11 that controls the additive manufacturing device 1, and a manufacturing unit 12 that performs processing to manufacture an object.

The manufacturing unit 12 includes the heat source, a material supply unit that feeds material from a supply source of the material, and an axial drive unit that moves the processing point in an object. The processing point is defined as a position where processing of adding material is being performed. FIG. 1 omits illustrations of the heat source, the material supply unit, and the axial drive unit. The heat source outputs a beam in accordance with an output command from the NC device 11. The material supply unit supplies material to the processing point in accordance with a supply command from the NC device 11. The axial drive unit moves the processing point in accordance with an axial command from the NC device 11.

The NC device 11 controls the additive manufacturing device 1 in accordance with a processing program 27 created by the CAM device 2. In the processing program 27, a processing path is specified, through which the processing point is moved. The NC device 11 includes a program analyzation unit 17 that analyzes the processing program 27, and a command generation unit 18 that generates various types of commands in accordance with a processing path and a processing condition. The program analyzation unit 17 analyzes the processing path on the basis of the descriptions in the processing program 27.

The command generation unit 18 generates an axial command that is a group of interpolating points on the processing path per unit time. The command generation unit 18 generates an output command in accordance with a beam output condition that is a processing condition specified by the processing program 27, and a supply command in accordance with a material supply condition that is a processing condition specified by the processing program 27. The NC device 11 outputs an axial command to the axial drive unit to control the axial drive unit. The NC device 11 outputs an output command to the beam source to control the beam source. The NC device 11 outputs a supply command to the material supply unit to control the material supply unit. The command generation unit 18 outputs a coordinate value that is position data indicating the present position of the processing point to the display system 10 on the basis of the generated axial command. A configuration of the display system 10 is described later.

The CAM device 2 includes an input unit 20 to which Computer-Aided Design (CAD) data 24 is input, a target definition unit 21 that defines the shape portion as the target to be processed, a path generation unit 22 that generates a processing path, and a program generation unit 23 that generates the processing program 27.

The CAD data 24 includes data on design particulars of a product, such as the shape of the product, dimensions of the product, material, and manufacturing accuracy. The target definition unit 21 defines the shape portion as a target to be processed, and the shape portion as not a target to be processed in the shape specified by the CAD data 24. The shape portion defined as not a target to be processed includes a base material on which material is added when processing starts, and a jig to which the base material is fixed. In a case where the shape specified by the CAD data 24 includes a shape portion having already completed being processed, the target definition unit 21 defines this shape portion as not a target to be processed. The target definition unit 21 defines part of the shape specified by the CAD data 24, other than the shape portion defined as not a target to be processed, as a shape portion to be processed. The target definition unit 21 outputs a CAD model 25 that is design data that specifies a target shape for additive manufacturing, to the path generation unit 22 and the additive manufacturing device 1.

The path generation unit 22 generates a processing path for processing the shape portion that is a target to be processed on the basis of the CAD model 25 obtained from the target definition unit 21. The path generation unit 22 outputs path data 26 that is data on the generated processing path to the additive manufacturing device 1 and the program generation unit 23. The program generation unit 23 generates the processing program 27 that is an NC program on the basis of the path data 26 obtained from the path generation unit 22. The program generation unit 23 outputs the processing program 27 generated to the additive manufacturing device 1.

The additive manufacturing device 1 manufactures an object with a three-dimensional shape by processing of adding material on the basis of the CAD model 25 that is design data. The display system 10 displays the progress of processing by the additive manufacturing device 1.

The display system 10 includes an obtaining unit 13 that obtains various types of data, a processing unit 14 that processes the obtained data, an input unit 15 to which information is input by an input operation, and a display unit 16 that displays information on the progress of processing by the additive manufacturing device 1.

The obtaining unit 13 obtains the CAD model 25 from the target definition unit 21, the path data 26 from the path generation unit 22, and position data from the command generation unit 18. The obtaining unit 13 outputs each piece of data obtained to the processing unit 14. On the basis of the data from the obtaining unit 13, the processing unit 14 processes the data for displaying on the display unit 16. The processing unit 14 appropriately adjusts the data to be displayed in accordance with information input to the input unit 15. On the basis of the data having been processed in the processing unit 14, the display unit 16 displays the data. The display unit 16 displays a trace of the processing point superimposed over the three-dimensional shape on the basis of the CAD model 25.

Next, a hardware configuration of the display system 10 is described. The functional units of the display system 10 illustrated in FIG. 1 are implemented by a progress display program executed by using hardware. The progress display program is a program for conducting the progress display method according to the first embodiment.

Figure 2:
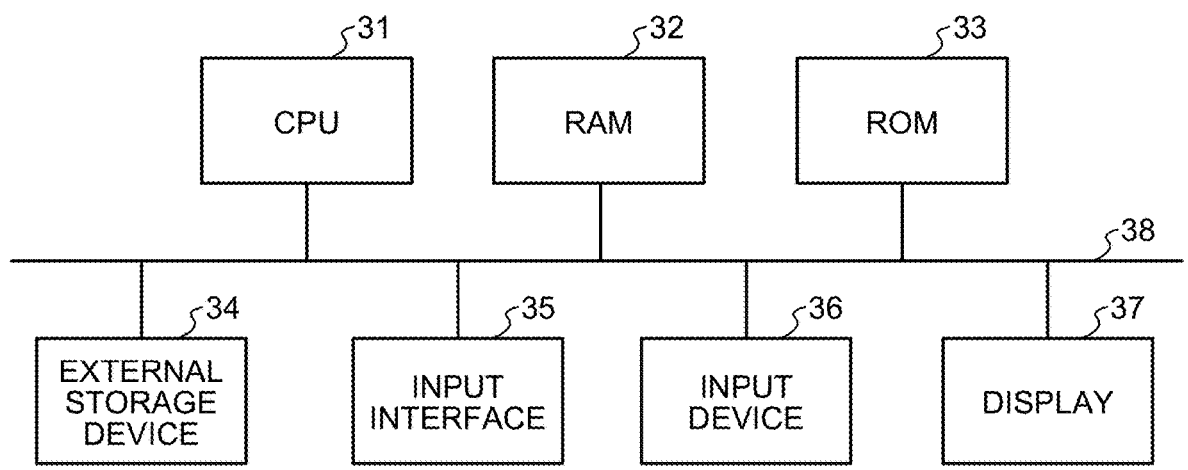
FIG. 2 is a block diagram illustrating a hardware configuration of the display system according to the first embodiment of the present invention.

FIG. 2 is a block diagram illustrating the hardware configuration of the display system 10 according to the first embodiment of the present invention. The display system 10 includes a CPU (Central Processing Unit) 31 that performs various types of processing, a RAM (Random Access Memory) 32 including a data storage area, a ROM (Read Only Memory) 33 that is a nonvolatile memory, and an external storage device 34. The display system 10 further includes an input interface 35 through which information is input to the display system 10, an input device 36 that receives an input operation, and a display 37 that displays information on a screen. The units illustrated in FIG. 2 are connected to each other through a bus 38.

The CPU 31 executes programs stored in the ROM 33 and the external storage device 34. The processing unit 14 illustrated in FIG. 1 is implemented by using the CPU 31. The external storage device 34 is an HDD (Hard Disk Drive) or an SSD (Solid State Drive). The external storage device 34 stores therein the progress display program, data obtained by the obtaining unit 13, and information input to the input unit 15. The ROM 33 has stored therein a boot loader that is software or a program to control the hardware, such as a BIOS (Basic Input/Output System) or a UEFI (Unified Extensible Firmware Interface) that is a basic control program for a computer or a controller that is the display system 10. It is allowable that the progress display program is stored in the ROM 33.

The programs stored in the ROM 33 and the external storage device 34 are loaded to the RAM 32. The CPU 31 develops the progress display program in the RAM 32 to perform various types of processing. The input interface 35 is a connection interface connected with devices outside the display system 10. The CAD model 25, the path data 26, and the position data are input to the input interface 35. The obtaining unit 13 illustrated in FIG. 1 is implemented by using the input interface 35.

The input device 36 is a device for inputting information, such as a keyboard or a pointing device. The input unit 15 illustrated in FIG. 1 is implemented by using the input device 36. The display 37 is a display device such as a liquid crystal display or an organic EL display. The display unit 16 illustrated in FIG. 1 is implemented by using the display 37. Furthermore, it is allowable that the display system 10 includes an output device that outputs a voice such as a speaker.

It is allowable that the progress display program is a program stored in a computer-readable storage medium. It is also allowable that the display system 10 stores the progress display program, having been stored in the storage medium, into the external storage device 34. The storage medium may be a transportable storage medium that is a flexible disk, or may be a flash memory that is a semiconductor memory. It is allowable to install the progress display program from another computer or a sever device on the computer or the controller that serves as the display system 10 through a communication network.

Functions of the display system 10 can be also implemented by a processing circuit that is dedicated hardware. The processing circuit is a single circuit, a composite circuit, a programmed processor, a parallel programmed processor, an ASIC (Application Specific Integrated Circuit), an FPGA (Field-Programmable Gate Array), or a combination thereof. A part of the functions of the NC device 11 can be also implemented by dedicated hardware, and other parts thereof can be implemented by software or firmware.

The display system 10 is not limited to being included in the configuration of the additive manufacturing device 1. It is allowable that the display system 10 is included in a device outside the additive manufacturing device 1. It is also allowable that the functional units of the display system 10 are not limited to being included in a single device, but may be incorporated separately in a plurality of devices. For example, in the display system 10 illustrated in FIG. 1, the obtaining unit 13, the processing unit 14, and the input unit 15 may be included by the additive manufacturing device 1, while the display unit 16 may be included in a device connected to the additive manufacturing device 1 through a network. In the manner as described above, the display system 10 may be implemented by using a single device, or may be implemented by using a plurality of devices.

Figure 3:
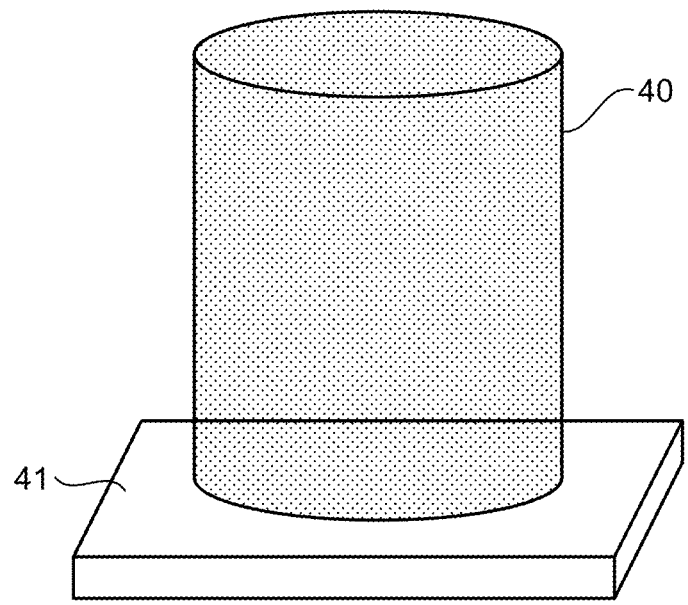
FIG. 3 is a diagram illustrating a first display example provided by the display system according to the first embodiment of the present invention.

Next, a display provided by the display system 10 is described. FIG. 3 is a diagram illustrating a first display example provided by the display system 10 according to the first embodiment of the present invention. The first display example is an example of the display when the additive manufacturing device 1 included in the additive manufacturing system 100 starts processing.

In this example, a target shape specified by the CAD model 25 is a solid elliptical cylindrical shape. The display unit 16 displays a 3D model 40 that is a three-dimensional shape on the basis of the CAD model 25. The display unit 16 displays the 3D model 40 in the manner of transparent display. The transparent display is defined as a display that allows the far side of a displayed object to be seen through the object. The processing unit 14 processes the data to display the target shape in the manner of transparent display.

The display unit 16 displays a base material 41 along with the 3D model 40 that is a target shape. The target shape is manufactured on the base material 41. Since the base material 41 is not a target to be processed, the display unit 16 does not display the base material 41 in the manner of transparent display. The 3D model 40 is displayed in such a manner that a part of the base material 41 on the far side of the target shape can be seen through the 3D model 40.

While displaying the 3D model 40 in the manner of transparent display, the display unit 16 colors the 3D model 40 in its entirety and displays the 3D model 40. Coloring the 3D model 40 refers to use of different colors for a display color and a background color of the 3D model 40. The display color of the 3D model 40 can be any color that is distinguishable from the background. The processing unit 14 processes the data to display the 3D model 40 in a set display color. By displaying the 3D model 40 having been colored, the display system 10 can make the 3D model 40 visually noticeable. It is allowable that the input unit 15 receives an operation to change the display color of the 3D model 40. When there is an operation to change the display color of the 3D model 40, the processing unit 14 performs a process of changing the display color of the 3D model 40 to a specified color. The display unit 16 may display the base material 41 in any display color. In the first embodiment, it is assumed that the color includes a chromatic color and an achromatic color.

A display provided by the display unit 16 is not limited to a color display, but may be a monochrome display. In a case of the monochrome display, the processing unit 14 performs a process of changing the level of grayscale for the 3D model 40 differently from a portion other than the 3D model 40. Also in this case, the display system 10 can make the 3D model 40 visually noticeable.

Figure 4:
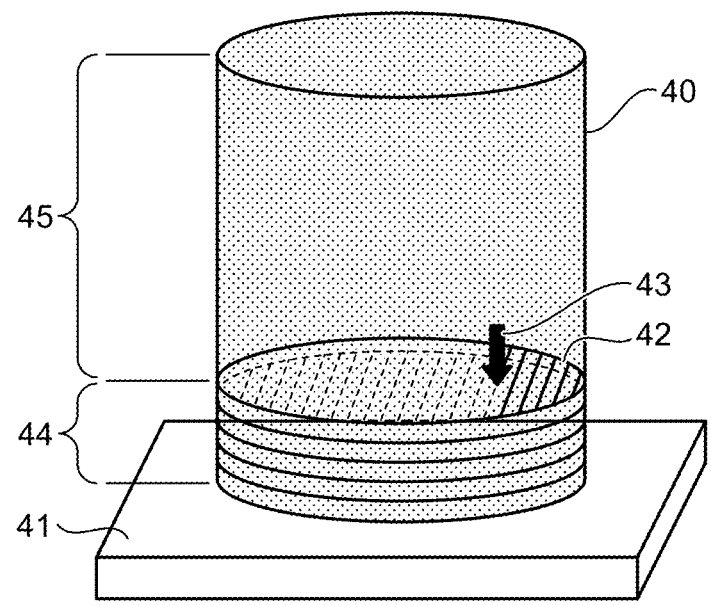
FIG. 4 is a diagram illustrating a second display example provided by the display system according to the first embodiment of the present invention.

FIG. 4 is a diagram illustrating a second display example provided by the display system 10 according to the first embodiment of the present invention. The second display example is an example of the display when the processing has progressed from the state in the first display example. The display unit 16 displays the 3D model 40 and the base material 41 that are identical to those displayed in the first display example.

The display unit 16 displays a trace of the processing point superimposed over the 3D model 40. In the first embodiment, the display unit 16 displays an actual trace 42 that is a trace through which the processing point has moved before reaching the present position. The display unit 16 also displays a mark 43 that represents the present position of the processing point with the mark 43 superimposed over the 3D model 40.

The obtaining unit 13 obtains position data that indicates the present position of the processing point as needed after the start of processing of a target shape. The processing unit 14 generates data on the actual trace 42 by performing a process of plotting the position data obtained by the obtaining unit 13 and connecting the plots with a line. The processing path generated by the path generation unit 22 is a trace that is set as a target toward which the processing point is moved. In the following descriptions, the trace that is set as a target is sometimes referred to as "optimal trace". The path data 26 indicates the optimal trace.

The processing unit 14 performs a process of displaying the mark 43 that represents the present position on the basis of the latest position data obtained by the obtaining unit 13. In the second display example, the mark 43 is an arrow indicating the present position. The present position indicated by the mark 43 is also regarded as a position of the leading end of the actual trace 42. The mark 43 can be anything that allows a user to recognize the present position, and may be any mark other than the arrow.

Figure 5:
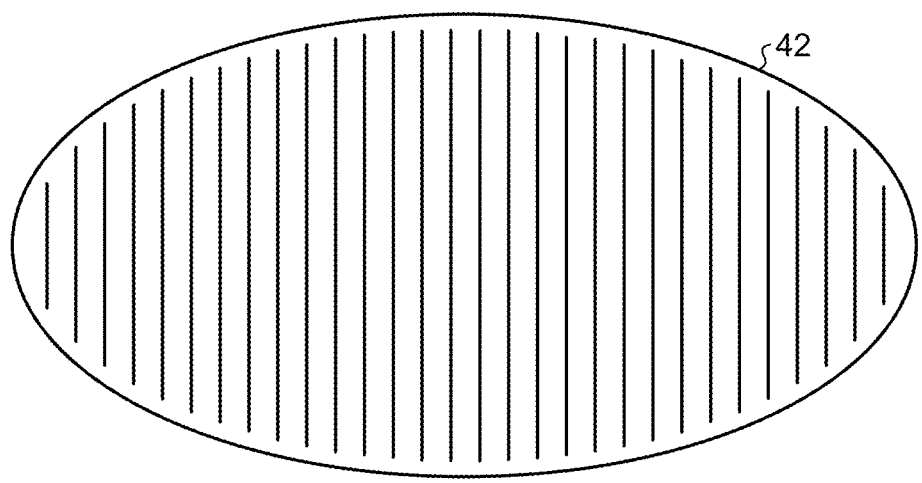
FIG. 5 is an explanatory diagram of an actual trace displayed in the second display example illustrated in FIG. 4.

The additive manufacturing device 1 deposits elliptical layers on the base material 41 to manufacture an object with an elliptical cylindrical shape. FIG. 5 is an explanatory diagram of the actual trace 42 displayed in the second display example illustrated in FIG. 4. FIG. 5 illustrates the actual trace 42 in processing on a single layer when viewed in plan. In the processing on the layer, the additive manufacturing device 1 adds material while moving the processing point along the ellipse to thereby process the outside circumference that becomes a curved surface of the elliptical cylindrical shape. Next, on the inside of the ellipse, the additive manufacturing device 1 repeats addition of material while moving the processing point in a direction parallel to the minor axis of the ellipse, and axial movement in a direction parallel to the major axis without adding material. The axial movement is herein regarded as movement in accordance with an axial command. Due to this operation, the additive manufacturing device 1 performs processing to fill the inside of the ellipse with the material. The additive manufacturing device 1 forms the layer in this manner. The additive manufacturing device 1 manufactures an object by depositing the layers as described above one after another.

The actual trace 42 is displayed so that a user can know the state of the actual processing up to the present position of the processing point. The actual trace 42 displayed by the display system 10 is a trace when material is being added, and does not include a trace when the processing point axially moves without adding material. The display unit 16 displays the actual trace 42 excluding a section where the processing point moves without adding material. The trace through which the processing point has moved without adding material is excluded from the actual trace 42, so that the display system 10 can display a trace through which the processing point has moved in a more visible manner. The display system 10 is also capable of accurately displaying the progress of the processing.

FIG. 4 illustrates a display example in which a plurality of layers are deposited while one layer is being processed. In this state, the display unit 16 displays the actual trace 42 through which the deposited layers have been processed, and the actual trace 42 up to the present position of the processing point on a layer on which the processing is currently performed. The display unit 16 displays the actual trace 42 in a color different from the 3D model 40. The display color of the actual trace 42 can be any color that is distinguishable from the 3D model 40. The processing unit 14 processes the data to display the actual trace 42 in a set display color. By displaying the actual trace 42 in a color different from the 3D model 40, the display system 10 can make the actual trace 42 visibly noticeable. It is allowable that the input unit 15 receives an operation to change the display color of the actual trace 42. When there is an operation to change the display color of the actual trace 42, the processing unit 14 performs a process of changing the display color of the actual trace 42 to a specified color.

In a display provided by the display unit 16, a portion 44 of the 3D model 40, where the actual trace 42 is displayed, represents a portion having completed being processed. A portion 45 of the 3D model 40, where the actual trace 42 is not displayed, represents a portion not having been processed yet. Depending on the presence or absence of the actual trace 42, a user can easily distinguish the portion 44 of a target shape, which has completed being processed, from the portion 45 of the target shape, which has not yet been processed. The mark 43 is displayed along with the actual trace 42, so that a user can easily identify the present position of the processing point along with the progress status of the processing.

In a display provided by the display unit 16, the actual trace 42 extends with the progress of the processing. In a display provided by the display unit 16, the mark 43 moves with the progress of the processing. By the extension of the actual trace 42 and the movement of the mark 43, a user can intuitively understand the state of processing in progress in a real-time manner. A user can easily understand that the processing is smoothly progressing in view of the fact that the mark 43 is moving.

By displaying the 3D model 40 in the manner of transparent display, the display unit 16 can display the actual trace 42 in a visible manner in a portion of the 3D model 40 surrounded by the outline. By such display, a user can easily understand the progress status of processing of a target shape.

FIG. 4 illustrates the actual trace 42 on the outside circumference of the ellipse on a plurality of deposited layers. As for some of the layers, illustrations of the actual trace 42 on the inside of the ellipse are omitted. As for a layer immediately below the layer on which processing is currently performed, a part of the actual trace 42 on the inside of the ellipse is illustrated by a dotted line.

It is allowable that the display unit 16 displays the portion 44 of the 3D model 40, which has completed being processed, and the portion 45 of the 3D model 40, which has not yet been processed, in different colors. Other than the display in different colors, the display unit 16 may also use different levels of transparency for the transparent display of the portion 44 and the portion 45. Due to the different levels of transparency, the display unit 16 can display the portion 44 of a target shape, which has completed being processed, and the portion 45 of the target shape, which has not yet completed being processed, in an easily distinguishable manner.

It is allowable that the display unit 16 changes the display of the actual trace 42 regarding a plurality of layers, on which processing has been completed, to a display of the layers as an integral part of the object. The display unit 16 displays the actual trace 42 for processing on a layer on which processing is currently performed. In this case, the display unit 16 can display the actual trace 42 on the layer on which processing is currently performed in a manner easily distinguishable from the layers on which processing has been completed.

It is allowable that the display unit 16 displays the actual trace 42 in its entirety in the same color. It is also allowable that the display unit 16 displays a part of the actual trace 42 in a color different from the other part of the actual trace 42. The display color of the actual trace 42 on the layer on which processing is currently performed may be different from the display color of the actual trace 42 on the layer on which processing has been completed. In this case, it is possible to distinguish the actual trace 42 on the layer on which processing is currently performed from the actual trace 42 on the layer on which processing has been completed. The display system 10 can make the actual trace 42 on the layer on which processing is currently performed visibly noticeable. A user can easily identify the actual trace 42 on the layer on which processing is currently performed.

Figure 6:
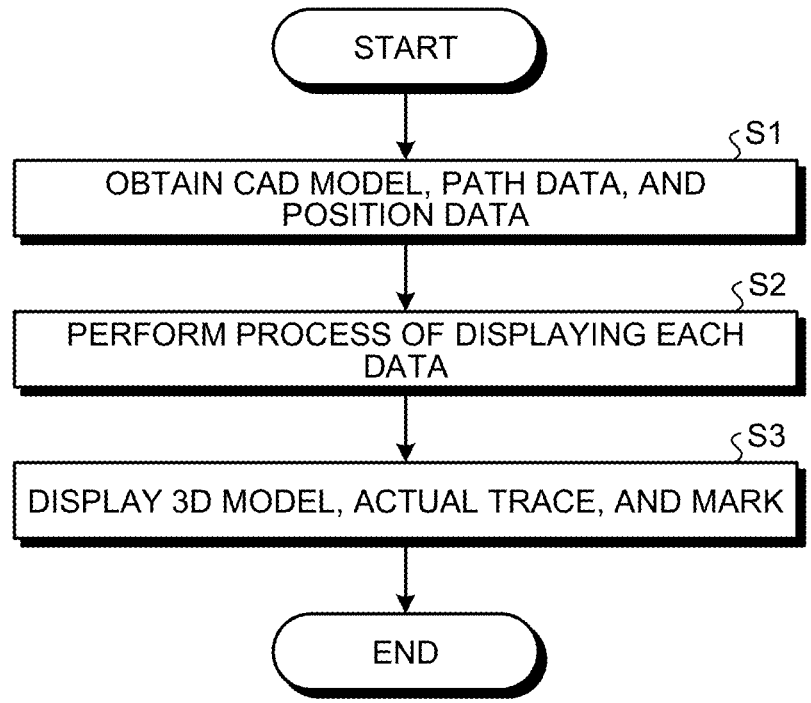
FIG. 6 is a flowchart illustrating a procedure in an operation of the display system according to the first embodiment of the present invention.

FIG. 6 is a flowchart illustrating a procedure in an operation of the display system 10 according to the first embodiment of the present invention. At Step S1, the obtaining unit 13 obtains the CAD model 25 output from the target definition unit 21, the path data 26 output from the path generation unit 22, and position data output from the command generation unit 18.

At Step S2, the processing unit 14 performs a process of displaying each data obtained at Step S1. The processing unit 14 performs a process of displaying the 3D model 40 on the basis of the CAD model 25. On the basis of the position data, the processing unit 14 performs a process of displaying the actual trace 42 and a process of displaying the mark 43. At Step S3, the display unit 16 displays the 3D model 40, the actual trace 42, and the mark 43 on the basis of the data processed at Step S2. With this display, the display system 10 ends the operation in accordance with the procedure illustrated in FIG. 6.

The processing unit 14 determines whether the actual trace 42 deviates from an optimal trace on the basis of the path data 26 obtained at Step S1. When the gap between the optimal trace and the actual trace 42 exceeds a length set in advance, the processing unit 14 outputs a command to display an alarm. The display unit 16 provides an alarm display on the basis of the command from the processing unit 14. It is allowable that the display system 10 outputs an alarm sound from the speaker described above. Due to this operation, a user can recognize that irregular manufacturing is being performed by the alarm output by the display system 10.

It is allowable that the display system 10 displays an optimal trace instead of the actual trace 42. The processing unit 14 determines the position on the optimal trace corresponding to the present position of the processing point, so that the display system 10 displays the optimal trace up to the position corresponding to the present position. The display system 10 may not obtain the path data 26 when the display system 10 does not output an alarm or display an optimal trace.

It is allowable that the display system 10 provides a display for a single additive manufacturing device 1, or provides a display for a plurality of the additive manufacturing devices 1. When the display system 10 provides a display for a plurality of the additive manufacturing devices 1, a user can check the progress of processing in the additive manufacturing devices 1 all at once.

A user can easily check the progress status of processing through the display system 10 without relying on visual check of a real object or a captured image of the object. Even when it is difficult to visually recognize an object or even when an object is at a position where it is difficult to capture an image of the object by the additive manufacturing device 1, a user can still easily check the progress status of processing. Even when it is difficult to visually recognize or capture an image of the processing point and its vicinity due to irradiation of a beam or light emission caused by arc discharge, a user can still easily check the progress status of processing.

According to the first embodiment, the display system 10 obtains position data that indicates the present position of the processing point, and displays the actual trace 42 superimposed over the three-dimensional shape. Due to this operation, the display system 10 achieves an effect of displaying the progress of processing of a three-dimensional shape performed by the additive manufacturing device 1 in an easily understandable manner for a user.

Second Embodiment

Figure 7:
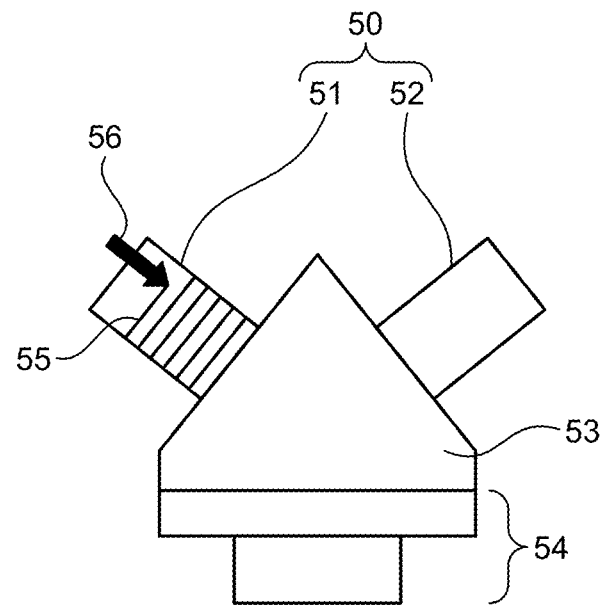
FIG. 7 is a diagram illustrating a first display example provided by a display system according to a second embodiment of the present invention.
Figure 8:
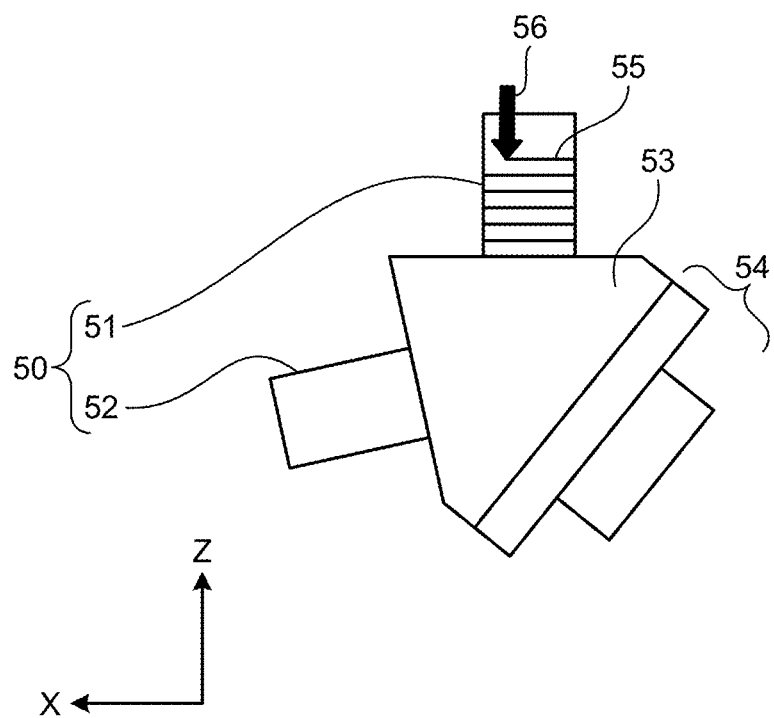
FIG. 8 is a diagram illustrating a second display example provided by the display system according to the second embodiment of the present invention.

FIG. 7 is a diagram illustrating a first display example provided by the display system 10 according to a second embodiment of the present invention. FIG. 8 is a diagram illustrating a second display example provided by the display system 10 according to the second embodiment of the present invention. In the second embodiment, the display unit 16 provides a first display and a second display. In the first display, the orientation of a three-dimensional shape is fixed regardless of a change in the orientation of an object for the processing. In the second display, the orientation of the three-dimensional shape is changed with a change in the orientation of an object for the processing. In the second embodiment, constituent elements identical to those of the first embodiment are denoted by like reference signs and configurations different from those of the first embodiment are mainly described. The configuration of the additive manufacturing system 100 including the display system 10 according to the second embodiment is identical to the configuration of the additive manufacturing system 100 including the display system 10 according to the first embodiment. The progress display by the display system 10 according to the second embodiment is explained here with reference to FIG. 1 as appropriate.

The manufacturing unit 12 illustrated in FIG. 1 includes a rotational mechanism capable of rotating an object about a first axis, and rotating an object about a second axis perpendicular to the first axis. The rotational mechanism is driven in accordance with a rotational command generated by the command generation unit 18. FIG. 1 omits illustrations of the rotational mechanism.

In the second embodiment, the additive manufacturing device 1 manufactures an object including a cylindrical body provided on one side of a base material 53, and a cylindrical body provided on another side of the base material 53. The base material 53 is attached to a jig 54. The CAD model 25 specifies a target shape, that is, two cylindrical shapes. A 3D model 50 that is a target shape includes a first model 51 that is one of the cylindrical shapes, and a second model 52 that is the other cylindrical shape. FIGS. 7 and 8 illustrate a state in which processing of one of the cylindrical bodies that is the first model 51 is being performed. The display unit 16 displays an actual trace 55 superimposed over the first model 51. The display unit 16 displays a mark 56 that represents the present position of the processing point with the mark 56 superimposed over the first model 51.

The axial drive unit in the manufacturing unit 12 moves the processing point in three axial directions. The X-axis and the Z-axis illustrated in FIGS. 7 and 8 are two of the three axes. The Z-axis direction refers to the vertical direction. As for the additive manufacturing device 1, an object rotates as the rotational mechanism is driven.

The first display example illustrated in FIG. 7 shows the first display in which the orientation of the 3D model 50 for the display is fixed regardless of the change in the orientation of an object due to driving of the rotational mechanism. In the first display, although the actual orientation of an object is changed with respect to the additive manufacturing device 1, the orientation of the 3D model 50 for the display remains unchanged. The orientation of the actual trace 55 displayed also remains unchanged. In the first display example, the display system 10 facilitates recognition of the state of processing in progress. Even when the processing point is at a position where it is difficult to be visually recognized in the actual orientation of an object, the processing point can still be easily recognized in the first display.

The second display example illustrated in FIG. 8 shows the second display in which the orientation of the 3D model 50 for the display is changed with the change in the orientation of an object due to driving of the rotational mechanism. In the second display, when the actual orientation of an object is changed for the additive manufacturing device 1, the orientation of the 3D model 50 for the display is also changed in the same manner as the object. The orientation of the actual trace 55 displayed is also changed. In the second display, the display system 10 can display the progress status of processing of an object in the actual orientation.

By operating the input unit 15, a user can select either the first display or the second display to be displayed on the display unit 16. Due to this operation, the user selects either the first display or the second display as desired, and can thereby check the progress status of processing. It is allowable that the display unit 16 is capable of switching a screen between the first display and the second display, or provides the first display and the second display at the same time on a single screen. It is allowable that the display unit 16 rotates the display, zooms in or out the display, moves the display, and the like in accordance with an operation to the input unit 15. With this operation, the user can check the status of the processing in progress in detail.

According to the second embodiment, the display system 10 displays the progress of processing in the manner of the first display, and displays the progress of processing in the manner of the second display. Due to this operation, the display system 10 achieves an effect of displaying the progress of processing of a three-dimensional shape performed by the additive manufacturing device 1 in an easily understandable manner for a user.

Third Embodiment

Figure 9:
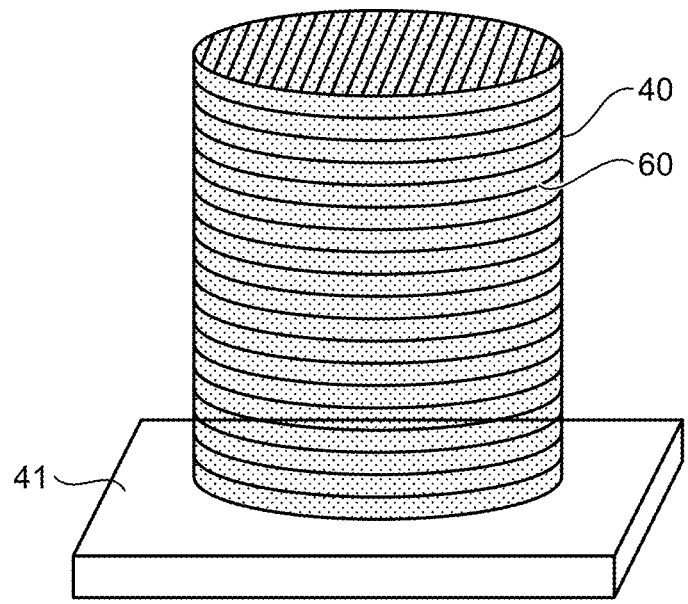
FIG. 9 is a diagram illustrating a first display example provided by a display system according to a third embodiment of the present invention.
Figure 10:
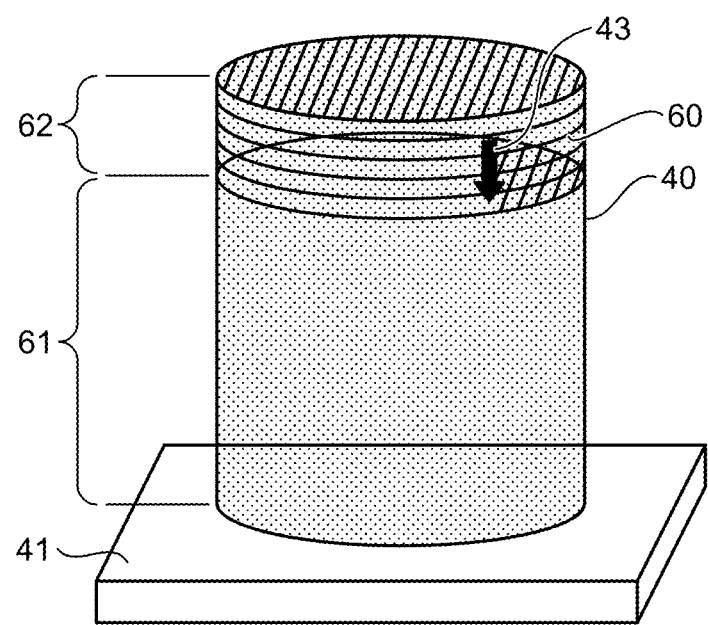
FIG. 10 is a diagram illustrating a second display example provided by the display system according to the third embodiment of the present invention.

FIG. 9 is a diagram illustrating a first display example provided by the display system 10 according to a third embodiment of the present invention. FIG. 10 is a diagram illustrating a second display example provided by the display system 10 according to the third embodiment of the present invention. In the third embodiment, the display unit 16 deletes an optimal trace 60 with the progress of processing, or changes the display of the optimal trace 60 with the progress of processing to thereby display the progress of processing. In the third embodiment, constituent elements identical to those of the first and second embodiments are denoted by like reference signs and configurations different from those of the first and second embodiments are mainly described. The display system 10 according to the third embodiment has an identical configuration as that of the display system 10 according to the first embodiment.

The first display example illustrated in FIG. 9 is an example of the display when the additive manufacturing device 1 included in the additive manufacturing system 100 starts processing. The display unit 16 displays the optimal trace 60 that is a trace of the processing point with the optimal trace 60 superimposed over the 3D model 40. The processing unit 14 performs a process of displaying the optimal trace 60 on the basis of the path data 26 obtained from the path generation unit 22. In the first display example, the optimal trace 60 for an object in its entirety is displayed. The display unit 16 displays the optimal trace 60 in a color different from the 3D model 40. The display color of the optimal trace 60 can be any color that is distinguishable from the 3D model 40.

The optimal trace 60 displayed by the display system 10 is a trace when material is added, and does not include a trace when the processing point axially moves without adding material. The display unit 16 displays the optimal trace 60 excluding a section where the processing point moves without adding material. The trace through which the processing point has moved without adding material is excluded from the optimal trace 60, so that the display system 10 can display a trace through which the processing point is scheduled to move in a more visible manner.

The second display example illustrated in FIG. 10 is an example of the display when the processing has progressed from the state in the first display example. In the second display example, the display unit 16 deletes a part of the optimal trace 60 through which the processing point has moved before reaching the present position. The processing unit 14 performs a process of determining the position on the optimal trace 60 corresponding to the present position of the processing point, and then deleting the optimal trace 60 up to the position corresponding to the present position. The display unit 16 also displays the mark 43 that represents the present position of the processing point with the mark 43 superimposed over the 3D model 40.

In a display provided by the display unit 16, a portion 61 of the 3D model 40, where the optimal trace 60 is not displayed, represents a portion having completed being processed. A portion 62 of the 3D model 40, where the optimal trace 60 is displayed, represents a portion not having been processed yet. Depending on the presence or absence of the optimal trace 60, a user can easily distinguish the portion 61 of a target shape, which has completed being processed, from the portion 62 of the target shape, which has not yet been processed. The mark 43 is displayed along with the optimal trace 60, so that the user can easily identify the present position of the processing point along with the progress status of the processing.

By displaying the 3D model 40 in the manner of transparent display, the display unit 16 can display the optimal trace 60 in a visible manner in a portion of the 3D model 40 surrounded by the outline. By such display, a user can easily understand the progress status of processing of a target shape.

In a display provided by the display unit 16, the optimal trace 60 becomes shorter with the progress of the processing. In a display provided by the display unit 16, the mark 43 moves with the progress of the processing. By the shortening of the optimal trace 60 and the movement of the mark 43, a user can intuitively understand the state of processing in progress in a real-time manner. A user can easily understand that the processing is smoothly progressing in view of the fact that the mark 43 is moving.

It is allowable that instead of deleting a portion of the optimal trace 60, on which processing has been completed, the display unit 16 displays the portion of the optimal trace 60, on which processing has been completed, in a manner different from another portion of the optimal trace 60, on which processing has not yet been completed. It is allowable that the display unit 16 represents a portion of the optimal trace 60, on which processing has not yet been completed, by a solid line, while representing another portion of the optimal trace 60, on which processing has been completed, by a dotted line or the like other than the solid line. It is also allowable that the display unit 16 displays a portion of the optimal trace 60, on which processing has not yet been completed, and another portion of the optimal trace 60, on which processing has been completed, with different line widths or in different colors. In these cases, the display system 10 can also display the progress of processing of the portion 61 of the target shape, which has completed being processed, and the portion 62 of the target shape, which has not yet been processed, in an easily distinguishable manner from each other.

The processing unit 14 determines whether there is a deviation between the optimal trace 60 and the present position of the processing point. When the gap between the optimal trace 60 and the actual trace 42 that is a real trace of the processing point exceeds a length set in advance, the processing unit 14 outputs a command to issue an alarm. The display unit 16 provides an alarm display on the basis of the command from the processing unit 14. It is allowable that the display system 10 outputs an alarm sound from the speaker described above. Due to this operation, a user can recognize that irregular manufacturing is being performed by the alarm output by the display system 10.

It is allowable that the display system 10 according to the second embodiment described above displays the optimal trace 60, instead of displaying the actual trace 55, in the same manner as in the third embodiment. Also in this case, a user can check the status of the processing in progress by both the first display and the second display.

According to the third embodiment, the display system 10 obtains position data that indicates the present position of the processing point, and displays the optimal trace 60 superimposed over the three-dimensional shape. Due to this operation, the display system 10 achieves an effect of displaying the progress of processing of a three-dimensional shape performed by the additive manufacturing device 1 in an easily understandable manner for a user.

The configurations described in the above embodiments are only examples of the content of the present invention. The configurations can be combined with other well-known techniques, and part of each of the configurations can be omitted or modified without departing from the scope of the present invention.

REFERENCE SIGNS LIST

1 additive manufacturing device, 2 CAM device, 10 display system, 11 NC device, 12 manufacturing unit, 13 obtaining unit, 14 processing unit, 15, 20 input unit, 16 display unit, 17 program analyzation unit, 18 command generation unit, 21 target definition unit, 22 path generation unit, 23 program generation unit, 24 CAD data, 25 CAD model, 26 path data, 27 processing program, 31 CPU, 32 RAM, 33 ROM, 34 external storage device, 35 input interface, 36 input device, 37 display, 38 bus, 40, 50 3D model, 41, 53 base material, 42, 55 actual trace, 43, 56 mark, 44, 45, 61, 62 portion, 51 first model, 52 second model, 54 jig, 60 optimal trace, 100 additive manufacturing system.

The invention claimed is:

1. A display system that displays a progress of processing by an additive manufacturing device that manufactures an object with a three-dimensional shape by processing of adding material on a basis of design data, the display system comprising:

an input interface to obtain position data that indicates a present position of a processing point where the processing is performed; and a display to display an actual trace of the processing point superimposed over the three-dimensional shape based on the design data so as to display a progress of processing from start of processing of the three-dimensional shape up to a processing point where the processing is being performed, wherein the display further displays a mark that represents the present position with the mark superimposed over the three-dimensional shape, the display displays an optimal trace of the processing point through which the processing point is scheduled to move from the present position so as to be superimposed over the three-dimensional shape, and the display displays a state of processing in progress in a real-time manner by shortening of the optimal trace and a movement of the mark, wherein the optimal trace becomes shorter with a progress of the processing and the mark moves with the progress of the processing, and the actual trace is a trace where the material is being added.

2. The display system according to claim 1, wherein the actual trace is a trace through which the processing point moves before reaching the present position.

3. The display system according to claim 1, wherein the display displays the three-dimensional shape in a manner of transparent display.

4. The display system according to claim 1, wherein the actual trace is a trace excluding a section where the processing point moves without adding the material.

5. The display system according to claim 1, wherein the display provides a first display in which an orientation of the three-dimensional shape for the display is fixed regardless of a change in orientation of the object for the processing, and provides a second display in which an orientation of the three-dimensional shape for the display is changed with a change in orientation of the object for the processing.

6. The display system according to claim 1, wherein the actual trace is a trace through which the processing point moves before reaching the present position, and the display displays a state of processing in progress in a real-time manner by an extension of the actual trace and a movement of the mark, wherein the actual trace extends with a progress of the processing and the mark moves with the progress of the processing.

7. An additive manufacturing device that manufactures an object with a three-dimensional shape by processing of adding material on a basis of design data, the additive manufacturing device comprising:
- an input interface to obtain position data that indicates a present position of a processing point where the processing is performed; and
- a display to display an actual trace of the processing point superimposed over the three-dimensional shape based on the design data so as to display a progress of processing from start of processing of the three-dimensional shape up to a processing point where the processing is being performed,
- wherein the display displays a mark that represents the present position with the mark superimposed over the three-dimensional shape,
- the display displays an optimal trace of the processing point through which the processing point is scheduled to move from the present position, to be superimposed over the three-dimensional shape,
- the display displays a state of processing in progress in a real-time manner by shortening of the optimal trace and a movement of the mark, wherein the optimal trace becomes shorter with a progress of the processing and the mark moves with the progress of the processing, and
- the actual trace is a trace where the material is being added.

8. The additive manufacturing device of claim 7, wherein
- the actual trace is a trace through which the processing point moves before reaching the present position, and
- the display displays a state of processing in progress in a real-time manner by an extension of the actual trace and a movement of the mark, wherein the actual trace extends with a progress of the processing and the mark moves with the progress of the processing.

9. A progress display method for displaying a progress of processing by an additive manufacturing device that manufactures an object with a three-dimensional shape by processing of adding material on a basis of design data, the progress display method comprising:
- obtaining position data that indicates a present position of a processing point where the processing is performed; and
- displaying an actual trace of the processing point superimposed over the three-dimensional shape based on the design data so as to display a progress of processing from start of processing of the three-dimensional shape up to a processing point where the processing is being performed,
- wherein a mark that represents the present position is displayed with the mark superimposed over the three-dimensional shape,
- an optimal trace of the processing point through which the processing point is scheduled to move from the present position, is displayed so as to be superimposed over the three-dimensional shape, and
- a state of processing in progress in a real-time manner is displayed by shortening of the optimal trace and a movement of the mark, wherein the optimal trace becomes shorter with a progress of the processing and the mark moves with the progress of the processing, and
- the actual trace is a trace where the material is being added.

10. The progress display method according to claim 9, wherein
- the actual trace is a trace through which the processing point moves before reaching the present position, and
- a state of processing in progress in a real-time manner is displayed by an extension of the actual trace and a movement of the mark, wherein the actual trace extends with a progress of the processing and the mark moves with the progress of the processing.

* * * * *